United States Patent Office 2,986,574
Patented May 30, 1961

2,986,574

9α-HALO-11β-ACYLOXY STEROIDS AND PROCESSES FOR THEIR MANUFACTURE

Cecil H. Robinson, Clifton, and Lawrence E. Finckenor, Lyndhurst, N.J., assignors to Schering Corporation, Bloomfield, N.J., a corporation of New Jersey No Drawing. Filed Mar. 13, 1959, Ser. No. 799,096

26 Claims. (Cl. 260—397.45)

This invention relates to novel steroid compounds and to processes for their manufacture.

More particularly, this invention relates to a novel method for converting a $\Delta^{9(11)}$-steroid to a 9α-halogeno-11β-acyloxy analog.

The value of 9β,11β-oxido steroids is well known in the art. By reacting same with a hydrogen halide there is produced a 9α-halo-11β-hydroxy system which is of great importance in the field of therapeutics. Among the many uses are conversion to potent therapeutic agents such as 9α-fluorohydrocortisone, 9α-fluoroprednisolone, dexamethasone and the like. In the androstane series the 9β,11β-oxido group is similarly transformable to provide for compounds such as 9α-fluoro-11β-hydroxy-17-methyltestosterone and a host of other therapeutically active substances.

Heretofore, 9,11-oxido steroids of the pregnane and androstane series have been prepared by treating the $\Delta^{9(11)}$-analog with hypobromous acid (or its chemical equivalent) thus forming a bromohydrin. The bromohydrin upon treatment with a base undergoes elimination of the elements of hydrogen bromide and thus forms an epoxide ring. In general, the yields on such transformations are in the range of 50–65% of theoretical. In our process the yields on converting a $\Delta^{9(11)}$-bond to a 9α-halogeno-11β-acylate are in the range of 90–95%. In many instances these compounds are transformable to 9β,11β-epoxides also in 90% yield. A further advantage of this invention is that the 9α-halo-11β-acylates are generally easily isolated by aqueous precipitation and filtration. The halohydrins obtained by the known procedures are generally oily or resinous in nature necessitating isolation by extraction with solvents.

Our novel process provides for the transformation of a $\Delta^{9(11)}$-steroid of the pregnane or androstane series to a 9α-halogeno-11β-acyloxy analog. The halogeno group is preferably bromo, although chloro and iodo may also be employed. The structure of the acyloxy group is not critical. Representative of acyloxy groups envisioned as falling within our invention are alkanoyloxy, e.g., those derived from hydrocarbon carboxylic acids such as formic, acetic, propionic, diethylacetic, caproic, capric and the like. Other carboxylic acid esters such as benzoate are also applicable. Similarly, substituted alkanoyloxy groups are utilizable such as trifluoroacetoxy, dichloroacetoxy. Other acyl groups such as derived from a sulfonic acid are also applicable, e.g., p-toluenesulfonyloxy, mesyloxy, benzenesulfonyloxy and the like. Our preferred substituent is formoxy or trifluoroacetoxy, since these groups have been found to be more easily removed under alkaline conditions than most others, thus generating the 9β,11β-oxido group.

The reagent which acts upon the $\Delta^{9(11)}$-bond is composed of a source of halonium ion such as an N-halogeno amide or imide together with the appropriate acid. For example, the reagent comprised of N-bromosuccinimide and trifluoroacetic acid acts upon a $\Delta^{9(11)}$-bond to form a 9α-bromo-11β-trifluoroacetoxy group. We have found that the presence of additional common acylate ion is helpful in obtaining higher yields. Thus, in the foregoing example, it is advantageous to add a salt of trifluoroacetic acid to the reaction mixture. The salt is preferably one formed with an alkali metal such as sodium, potassium or lithium, or an alkaline earth metal such as calcium, or a pseudo metal such as ammonium. The reaction is preferably carried out in the presence of an inert organic solvent such as tetrahydrofuran, carbon tetrachloride, chloroform, and the like. The choice of solvent is not critical, since the solvent merely acts as a diluent for the reactants. We have found that the yields in forming the 9α-halogeno-11β-acyloxy group, especially when applied in the pregnane series are generally in excess of 90% of theory.

Our novel 9α-halogeno-11β-esters under basic conditions such as sodium methoxide in methanol, potassium acetate in ethanol or aqueous sodium hydroxide in methanol, undergo saponification followed by elimination of hydrogen halide with concomitant formation of the epoxide ring. This conversion to 9β,11β-oxides is described and claimed in the copending application of Oliveto, Serial No. 799,095, filed March 13, 1959.

Our process is applicable to any steroid that possesses a $\Delta^{9(11)}$-bond. Although our process is most advantageously employed upon $\Delta^{9(11)}$-steroids, which already possess necessary substituents for ultimate therapeutic activity, it is not necessarily restricted to such compounds. Thus, we may employ as starting materials pregnenes such as 4,9(11)-pregnadiene-17α,21-diol-3,20-dione 21-acetate,
1,4,9(11)-pregnadiene-17α,21-diol-3,20-dione 21-acetate,
16-methyl(α or β)-1,4,9(11)-pregnatriene-17α,21-diol-3,20-dione 21-alkanoate,
4,9(11)-androstadiene-17α-methyl-17-β-ol-3-one,
1,4,9(11)-androstatriene-3,17-dione and the like.

Likewise, our process may be applied to a preparation starting with, for example, pregnane, or allopregnane)-11α-ol-3,20-dione. Dehydration of the 11α-hydroxy group via the 11-p-tosylate forms the $\Delta^{9(11)}$-bond which is then subjected to our reagent and process. The presence of an ester group on the 11β-hydroxyl permits effecting reactions on other parts of the molecule such as bromination and dehydrobromination of the A-ring or halogenation and acetoxylation at C-21 without participation by the reactive 11β-hydroxy group.

Furthermore, in the case of the pregnane series, the presence of the 11β-ester group permits oxidative cleavage of the side chain so as to form a 17-keto substituted androstane analog. Thus, 9α,β-bromo-11β-acetoxyprednisolone upon reaction with sodium bismuthate or chromic acid yields 9α-bromo-11β-acetoxy-1,4-androstadiene-3,17-dione. Treatment of this latter diene with strong alkali effects formation of 9β,11β-oxido-1,4-androstadiene-3,17-dione. The oxido compound is convertible to the valuable substance 9α-fluoro-1,4-androstadiene-11β-ol-3,17-dione according to the procedure described in copending application of Nobile, Serial No. 776,401, filed November 26, 1958, now U.S. Patent No. 2,955,118.

In addition to their use as intermediates in the preparation of 9β,11β-epoxides, our 9α-halogeno-11β-esters are therapeutically valuable as anti-inflammatory agents. The 11β-ester markedly reduces the untoward salt retaining effect of the halogen, especially chloro and thus finds utility in topical application such as in unguents or creams.

The following examples are illustrative of our process, its application and of the novel intermediates produced thereby.

EXAMPLE 1

9α-bromo-1,4-pregnadiene-11β,17α,21-triol-3,20-dione-11β-formate 21-acetate

To a stirred solution of 1.0 g. of 1,4,9(11)-pregnatriene-17α,21-diol-3,20-dione 21-acetate in 40 ml. of formic acid containing 4.0 g. of sodium formate is added 395 mg. N-bromoacetamide. Stirring is continued for 3 hours, and the reaction mixture is then poured into 400 ml. of water, filtered and the residue washed with water and dried. The dried residue weighs 1.26 g. and consists of 9α-bromo-1,4-pregnadiene-11β,17α,21-triol-3,20-dione-11β-formate 21-acetate. Purification is effected by crystallization from acetone-hexane, M.P. 210–213° C. dec., $\lambda_{max}^{MeOH}$ 239 m$\mu$ ($\epsilon$ 13,800)

*Analysis.*—Calcd. for $C_{24}H_{29}O_7Br$: C, 56.58; H, 5.74; Br, 15.69: Found: C, 56.27; H, 5.68; Br, 14.12.

EXAMPLE 2

9α-bromo-1,4-pregnadiene-11β,17α,21-triol-3,20-dione-11β-trifluoroacetate 21-acetate To a stirred solution of 1.0 g. of 1,4,9(11)-pregnatriene-17α,21-diol-3,20-dione 21-acetate in 20 ml. of tetrahydrofuran and 20 ml. of trifluoracetic acid is added 400 mg. N-bromoacetamide, the temperature being maintained at about 25° C. by cooling. Stirring at room temperature is continued for 3 hours, and the reaction mixture is then poured into 400 ml. of water and filtered. The residue is washed with water and dried, giving 9α-bromo-1,4-pregnadiene-11β,17α,21-triol-3,20-dione-11β-trifluoroacetate 21-acetate (1.35 g.; 90%). Purification is effected by crystallization from acetone-hexane, M.P. 205–210° dec., $\lambda_{max}^{MeOH}$ 240 m$\mu$ ($\epsilon$ 13,900)

*Analysis.*—Calcd. for $C_{25}H_{28}O_7BrF_3$: C, 52.00; H, 4.89; Br, 13.84. Found: C, 52.20; H, 4.89; Br, 13.76.

EXAMPLE 3

9α-chloro-1,4-pregnadiene-11β,17α,21-triol-3,20-dione-11β-formate 21-acetate To a stirred solution of 1.0 g. 1,4,9(11)-pregnatriene-17α,21-diol-3,20-dione 21-acetate in 40 ml. formic acid containing 4.0 g. sodium formate is added 382 mg. N-chlorosuccinimide followed immediately by 2.7 ml. of 1 N-hydrochloric acid. Stirring is continued for 3 hours at room temperature, and the reaction mixture is then poured into water (400 ml.). Filtration, followed by water-washing and drying of the residue gives 1.14 g. of 9α-chloro-1,4-pregnadiene-11β,17α,21-triol-3,20-dione-11β-formate 21-acetate. This compound, after crystallization from acetone-hexane, has M.P. 258–262° C. dec., $\lambda_{max}^{MeOH}$ 237 m$\mu$ ($\epsilon$ 14,500)

*Analysis.*—Calcd. for $C_{24}H_{29}O_7Cl$: C, 61.99; H, 6.28; Cl, 7.64. Found: C, 61.64; H, 6.58; Cl, 7.36.

EXAMPLE 4

9α-bromo-4-pregnene-11β,17α-21-triol-3,20-dione-11β-formate 21-acetate

To a stirred solution of 1.0 g. of 4,9(11)-pregnadiene-17α,21-diol-3,20-dione 21-acetate in 40 ml. of formic acid containing 4 g. potassium formate is added 395 mg. N-bromoacetamide. Stirring is continued for 3 hours, the reaction mixture was poured into 400 ml. water and filtered. The residue is washed and dried yielding 1.24 g. of 9α-bromo-4-pregnene-11β,17α,21-triol-3,20-dione-11β-formate 21-acetate $\lambda_{max}^{MeOH}$ 239 m$\mu$ ($\epsilon$ 14,000)

EXAMPLE 5

9α-bromo-4-pregnene-11β,17α-21-triol-3,20-dione-11β-trifluoracetate 21-acetate The 11β-trifluoracetate of this example is prepared from 4,9(11) - pregnadiene - 17α,21 - diol - 3,20 - dione 21-acetate exactly as described for Example 2. The yield of 9α - bromo - 4 - pregnene - 11β,17α,21 - triol-3,20-dione-11β-trifluoracetate 21-acetate, which exhibited $\lambda_{max}^{MeOH}$ 240 m$\mu$ ($\epsilon$ 13,800) is 92%

EXAMPLE 6

9α - bromo - 4 - pregnene - 11β - ol - 3,20 - dione - 11β-trifluoracetate

To a stirred solution of 1.0 g. of 4,9(11)-pregnadiene-3,20-dione in 25 ml. of tetrahydrofuran and 25 ml. of trifluoracetic acid is added N-bromoacetamide (450 mg.), the temperature being maintained at about 25° C. by cooling. Stirring at room temperature is continued for 3 hours, and the reaction mixture is poured into 500 ml. water and filtered. The residue is washed with water and dried, giving 1.47 g. 9α-bromo-4-pregnene-11β-ol-3,20-dione-11β-trifluoroacetate, $\lambda$ max. 240 m$\mu$. ($\epsilon$ 14,100).

EXAMPLE 7

9β-11β-oxido-1,4-pegnadiene-17α,21-diol-3,20-dione (A) From the compound of Example 1, the 11β-formate (570 mg.) is suspended in methanol (35 ml.) and to this suspension is added, dropwise with stirring, 2.85 ml. of 1 N-aqueous sodium hydroxide solution. Stirring is continued for 16 hours at room temperature, and the reaction mixture is then poured into 400 ml. water. The mixture is extracted with methylene chloride which upon evaporation yields the crude 9β,11β-oxido-21-ol (350 mg.). The substance is acetylated at C–21 in pyridine and acetic anhydride for 1½ hours, the acetylated product being isolated by water precipitation and filtration. The water-washed and dried residue weighs 350 mg., is crystallized from acetone-hexane to yield pure 9β,11β-oxido 21-acetate of this example identical with authentic material as evidenced by melting point, mixed melting point, comparison of infrared spectra and paper chromatography.

(B) The compound of Example 2 is dissolved in 100 ml. absolute ethanol containing 4 g. potassium acetate and the solution is refluxed for 17 hours. The reaction mixture is concentrated to about 20 ml., water is added, and the mixture is extracted with methylene chloride. The extracts are washed with water, dried with magnesium sulfate, filtered and evaporated in vacuo to yield the crude product (750 mg.). This material, on paper chromatography using a propylene glycol toluene-dioxane system, shows spots corresponding to about 80% of the 9β,11β-oxido 21-acetate and about 20% of the corresponding 21-alcohol. Reacetylation at C–21, using pyridine-acetic anhydride at room temperature, gives 750 mg. of product, which after filtration through Florisil in methylene chloride-ether (1:9) gives pure the 9β,11β-oxido 21-acetate of this example, identical with authentic material (melting point, mixed melting point and comparison of infrared spectra).

EXAMPLE 8

9β,11β-oxido-4-pregnene-17α,21-diol-3,20-dione 21-acetate

From the compound of Example 5, a solution of 1.0 g. 9α - bromo - 4 - pregnene - 11β,17α,21 - triol - 3,20-dione-11β-trifluoracetate 21-acetate in 20 ml. absolute ethanol (70 ml.) containing potassium acetate (3 g.) is refluxed for 17 hours. The reaction mixture is concentrated in vacuo and water is added, the mixture then being extracted with methylene chloride. The extracts are washed with water, dried over magnesium sulfate and evaporated in vacuo to yield 520 mg. crude product (75%). This material is reacetylated at C-21 in pyridine-acetate anhydride at room temperature, and the reactylated material is crystallized from acetone-hexane to yield pure 9β,11β - oxido - 4 - pregnene - 17α,21 - diol-3,20-dione 21-acetate identical with an authentic sample as demonstrated by melting point, mixed melting point and comparison of infrared spectra.

EXAMPLE 9

9β,11β-oxido-4-pregnene-3,20-dione

The 11β-trifluoracetate (from Example 6; 1.0 g.) is suspended in methanol (80 ml.) and to this suspension is added, dropwise with stirring, N-aqueous sodium hydroxide solution (4.0 ml.) at room temperature. Stirring is continued for 16 hours at room temperature, and the reaction mixture is poured into water (1 liter). The steroid is isolated by filtration, and the water-washed and dried residue weighs 700 mg. and consists of 9β,11β-oxido-4-pregnene-3,20-dione. Crystallization from acetone-hexane gives material, the infrared spectrum (in Nujol) of which matches the infrared spectrum of an authentic sample.

EXAMPLE 10

9α-bromo-1,4-androstadiene-11β-ol-3,17-dione-11β-trifluoro-acetate

The requisite intermediate, 1,4,9(11)-androstatriene-3,17-dione, is prepared as follows:

A solution of 11β-hydroxy - 1,4 - androstadiene-3,17-dione (935 mg.) in dimethylformamide (11 ml.) and pyridine (1 ml.) is cooled to 0° C., and methane sulphonyl chloride (0.784 g.) is added dropwise, with stirring. Stirring at room temperature is continued for 27 hours, and the reaction mixture is then diluted with water, extracted with methylene chloride and the extracts washed with sodium bicarbonate solution and water. Evaporation of the dried ($MgSO_4$) extracts in vacuo yielded the crude product (770 mg.; 88%).

After filtration through Florisil in ether, 640 mg. of the desired product is obtained. Crystallization from acetone-hexane yields 480 mg. of analytically pure triene, M.P. 164–167°, $$\lambda_{max}^{MeOH}\ 238\ m\mu\ (\epsilon\ 15,200)$$

To a stirred solution of the 1,4,9(11)-androstatriene (1.0 g.) in tetrahydrofuran (20 ml.) and trifluoracetic acid (20 ml.) is added N-bromoacetamide (530 mg.), the temperature being kept at about 25° C. by cooling. Stirring is continued, at room temperature, for 3 hours, and the reaction mixture is then poured into water (400 ml.) and filtered. The residue is washed with water, and dried, to yield 9α-bromo-1,4-androstadiene-11β - ol-3,17 - dione-11β - trifluoracetate 160 g., showing $$\lambda_{max}^{MeOH}\ 240\ m\mu\ (\epsilon\ 14,500)$$

EXAMPLE 11

Conversion of 9α-bromo - 1,4-androstadiene-11β-ol-3,17-dione-11β - trifluoracetate to 9β,11β - oxido - 1,4-androstadiene-3,17-dione The 11β-trifluoracetate from Example 10 (1.0 g.) in methanol (60 ml.) is treated with N-aqueous sodium hydroxide solution (4.2 ml.) at room temperature, with stirring. The stirred solution is left at room temperature for 8 hours, and the mixture is then poured into water (1 liter). The steroid is isolated by filtration, and the residue is washed with water and dried to yield 572 mg. (91%) of 9β,11β-oxido - 1,4 - androstadiene-3,17-dione. Purification is effected by crystallization from acetone-hexane, M.P. 164–165°, $$\lambda_{max}^{MeOH}\ 248\ m\mu\ (\epsilon\ 15,800)$$

EXAMPLE 12

Preparation of 9α-bromo-4-androstene-11β-ol-3,17-dione-11β-trifluoracetate

To a stirred solution of 4,9(11)-androstadiene-3,17-dione (1 g.) in tetrahydrofuran (30 ml.) and trifluoracetic acid (30 ml.) is added N-bromoacetamide (530 mg.), the temperature being maintained at about 25° by cooling. Stirring at room temperature is continued for 3 hours, and the reaction mixture is poured into water (500 ml.) and filtered. The residue is washed with water and dried, yielding 9α-bromo-4-androstene-11β-ol-3,17-dione-11β-trifluoracetate (1.57 g.).

EXAMPLE 13

Conversion of 9α-bromo-4-androstene-11β-ol-3,17-dione-11β-trifluoracetate to 9β,11β-oxido-4-androstene-3,17-dione To the 11β-trifluoracetate from Example 12 (500 mg.) in methanol (40 ml.) is added aqueous N-sodium hydroxide solution (2.1 ml.) at room temperature with stirring. The stirred mixture is left at room temperature for 8 hours, and is then poured into water (500 ml.) and filtered. The residue is washed with water and dried to give 560 mg. (90%) of 9β,11β-oxido-4-androstane-3,17-dione. Purification is effected by crystallization from acetone-hexane, M.P. 180°, identical with authentic material as determined by mixed melting point and comparison of infrared spectra.

EXAMPLE 14

9α-iodo-1,4-pregnadiene-11β,17α,21-triol-3,20-dione-11β,21-diacetate

To a stirred solution of 1,4,9(11)-pregnatriene-17α,21-diol-3,20-dione 21-acetate (5.0 g.) and lithium acetate (20 g.) in glacial acetic acid (200 ml.) is added N-iodosuccinimide (3.3 g.). Stirring is continued at room temperature for 17 hours, and the reaction mixture is then poured into water (1000 ml.). The resulting mixture is filtered, and the residue is washed with water and dried to give a quantitative yield of crude product. Crystallization from ethyl acetate gives pure 9α-iodo-1,4 - pregnadiene - 11β,17α,21 - triol-3,20-dione-11β,21-diacetate, M.P. 145–150° dec., $[\alpha]_D$ +165° (dioxane), $$\lambda_{max}^{MeOH}\ 241\ m\mu\ (\epsilon\ 11,000)$$

*Anaylsis.*—Calcd. for $C_{25}H_{31}O_7I$: C, 52:64; H, 5.48; I, 22.25. Found: C, 52.52; H, 5.30; I, 23.88.

EXAMPLE 15

9α-bromo-1,4-pregnadiene-11β,17α,21-triol-3,20-dione-11β,21-diacetate

To a solution of 1,4,9(11)-pregnatriene-17α,21-diol-3,20-dione 21-acetate (1.0 g.) in glacial acetic acid (40 ml.) containing lithium acetate (4 g.) is added N-bromoacetamide (395 mg.), and the mixture is stirred at room temperature for 3 hours. The mixture is then poured into water (400 ml.), filtered, and the residue is washed with water and dried, giving the crude product (1.5 g.; 95%). Crystallization from acetone-hexane furnishes pure 9α-bromo-1,4-pregnadiene-11β,17α,21-triol-3,20-dione-11β,21-diacetate, M.P. 208–210° dec., $[\alpha]_D$ +159° (dioxane), $$\lambda_{max}^{MeOH}\ 240\ m\mu\ (\epsilon\ 14,000)$$

*Analysis.*—Calcd. for $C_{25}H_{31}O_7Br$: C, 57.36; H, 5.97; Br, 15.27. Found: C, 57.38; H, 6.03; Br, 15.96.

EXAMPLE 16

9α-chloro-1,4-pregnadiene-11β,17α,21-triol-3,20-dione-11β,21-diacetate

To a stirred solution of 1,4,9(11)-pregnatriene-17α,21-diol-3,20-dione 21-acetate (1.0 g.) in glacial acetic acid (40 ml.) containing lithium acetate (4 g.) is added N-chlorosuccinimide (382 mg.) and a solution of hydrogen chloride (104 mg.) in tetrahydrofuran (2.5 ml.). Stirring is continued at room temperature for 2 hours, and the reaction mixture is then poured into water (400 ml.) and filtered. The residue is washed with water and dried to give 1.05 g. (85%) of crude product. Crystallization from acetone-hexane gives 9α-chloro-1,4-pregnadiene - 11β,17α,21 - triol - 3,20 - dione - 11β,21 - diacetate, M.P. 278–281° dec., $[\alpha]_D$ +163° (dioxane), $$\lambda_{max}^{MeOH}\ 236\ m\mu\ (\epsilon\ 15,600)$$

*Analysis.*—Calcd. for $C_{25}H_{31}O_7Cl$: C, 62.69; H, 6.52; Cl, 7.40. Found: C, 62.66; H, 6.60; Cl, 7.01.

EXAMPLE 17

*9α-bromo-16α-methyl-1,4-pregnadiene-11β,17α,21-triol-3,20-dione-11β-trifluoracetate 21-acetate*

A solution of 16α - methyl - 1,4,9(11) - pregnatriene-17α,21-diol-3,20-dione 21-acetate (1.0 g.) in tetrahydrofuran (40 ml.) and trifluoracetic acid (40 ml.) is cooled to 5°, and N-bromoacetamide (381 mg.) is added. The reaction mixture is allowed to attain room temperature and left, with shaking, at room temperature for 4 hours. The reaction mixture is then treated with water, filtered, and the residue is washed with water and dried to give the crude product in quantitative yield. Crystallization from acetone-hexane gives the compound of this example $$\lambda_{max}^{MeOH}\ 241\ m\mu\ (\epsilon\ 14,300)$$

EXAMPLE 18

*9α-bromo-16β-methyl-1,4-pregnadiene-11β,17α,21-triol-3,20-dione-11β-trifluoracetate 21-acetate*

A solution of 16β - methyl - 1,4,9(11) - pregnatriene-17α,21-diol-3,20-dione 21-acetate (1.0 g.) in tetrahydrofuran (40 ml.) and trifluoracetic acid (40 ml.) is treated with N-bromoacetamide (381 mg.) in the manner of the preceding example to give the compound of this example.

EXAMPLE 19

*9α-bromo-17α-methyl-4-androstene-11β,17β-diol-3-one-11β-acetate*

To a stirred solution of one gram of 17α-methyl-4,9(11)-androstadiene-17β-ol-3-one in glacial acetic acid (40 ml.) containing lithium acetate (4 g.) is added N-bromoacetamide (471 mg.) and the mixture is stirred at room temperature for 17 hours. The reaction mixture is then poured into water (400 ml.), filtered, and the residue is washed with water and dried to give the crude product. Crystallization from acetone-hexane gives 9α-bromo-17α-methyl-4-androstene-11β,17β-diol-3 - one - 11β acetate.

EXAMPLE 20

*Conversion of 9α-bromo-17α-methyl - 4 - androstene-11β, 17β-diol-3-one-11β-acetate to 9β,11β-oxido-17α-methyl-4-androstene-17β-ol-3-one*

To the compound of the preceding example (500 mg.) in methanol (20 ml.) is added aqueous 2 N-sodium hydroxide solution (2.6 ml.) and the resulting solution is refluxed for 17 hours. The reaction mixture is then cooled, neutralized with acetic acid, poured into water and filtered. The residue is washed with water and dried, to give 9β,11β-oxido-17α-methyl-4-androstene-17β-ol-3-one.

EXAMPLE 21

*9α-bromo-1,4-pregnadiene-11β,17α,21-triol-3,20-dione-11β-acetate*

One gram of 9α-bromo-1,4-pregnadiene-11β,17α,21-triol-3,20-dione-11β,21-diacetate (from Example 15) is suspended in 0.27 N methanolic perchloric acid (60 ml.) and the suspension is stirred at room temperature for 17 hours. Water (400 ml.) is added and the resulting mixture is filtered. The residue is washed with water and dried to give crude product. Crystallization from acetone-hexane yields the compound of this example as a crystalline solid.

EXAMPLE 22

*17,20; 20,21-bismethylenedioxy derivative of 9α-bromo-1,4-pregnadiene-11β,17α,21-triol-3,20-dione-11β-acetate*

The compound of the preceding example (500 mg.) is dissolved in chloroform (20 ml.) and formaldehyde (5 ml.; 37%) and concentrated hydrochloric acid (5 ml.) are added. The resulting mixture is stirred vigorously at room temperature for 48 hours, and is then evaporated in vacuo to low volume. Water is then added, and the mixture is filtered. The residue is washed with water, dried and crystallized from acetone-hexane to give the compound of this example.

EXAMPLE 23

*Conversion of the bismethylenedioxy derivative of 9α-bromo - 1,4 - pregnadiene - 11β,17α,21 - triol - 3,20 - dione-11β-acetate to 9β,11β-oxido-1,4-pregnadiene-17α, 21-diol-3,20-dione*

(A) The compound of the preceding example (1.0 g.) is dissolved in ethanol (40 ml.) and 2 N-aqueous sodium hydroxide solution (5 ml.) is added. The resulting solution is refluxed for 17 hours, and is then cooled and neutralized with acetic acid. Evaporation in vacuo to low volume and filtration gives crude product which consists substantially of the bismethylenedioxy derivative of 9β,11β-oxido-1,4-pregnadiene-17α,21-diol-3,20-dione.

(B) The above crude product is dissolved in 60% aqueous formic acid (50 ml.) and the resulting solution is left at room temperature for three days. Water precipitation, filtration and drying of the residue gives a crude product which consists substantially of 9β,11β-oxido-1,4-pregnadiene-17α,21-diol-3,20-dione.

We claim:

1. A member of the group consisting of 9α-halo-11β-R-17α,21-dihydroxy-3,20-diketo-Δ⁴-pregnenes, the corresponding Δ¹-analogs and the 21-lower fatty acid esters thereof wherein R is an acyloxy group having up to eight carbon atoms and the 9α-halo substituent has an atomic weight greater than 19.

2. A member of the group consisting of 9α-halo-Δ⁴-pregnene-11β-R-17α,21-diol-3,20-diones wherein R is a member of the group consisting of lower alkanoyloxy and halogenated lower alkanoyloxy and the 21-lower fatty acid esters thereof and the 9α-halo substituent has an atomic weight greater than 19.

3. A member of the group consisting of 11-lower alkanoyl and 11-halogenated lower alkanoyl-9α-halo-hydrocortisones and the 21-lower alkanoyl esters thereof wherein the 9α-halo substituent has an atomic weight greater than 19.

4. A member of the group consisting of 11-lower alkanoyl- and 11-halogenated lower alkanoyl - 9α - haloprednisolones and the 21-lower alkanoyl esters thereof wherein the 9α-halo substituent has an atomic weight greater than 19.

5. A steroid of the group consisting of Δ⁴-pregnenes of the general formula:

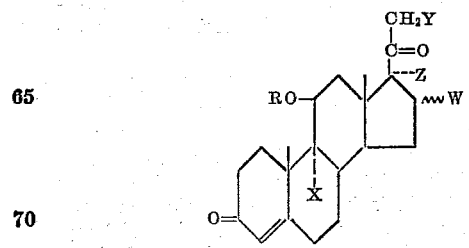

and the Δ¹-analogs thereof wherein X is halogen having an atomic weight greater than 19, Y is a member of the class consisting of H, OH and O-lower alkanoyl, Z is a member of the clas consisting of H and OH, W is a member of the class consisting of H and lower alkyl and R is a member of the class consisting of lower alkanoyl and halogenated lower alkanoyl.

6. 9α - bromo - 1,4 - pregnadiene - 11β,17α,21 - triol-3,20-dione-11β-formate 21-acetate.

7. 9α - bromo -1,4 - pregnadiene - 11β,17α,21 - triol-3,20-dione-11β-trifluoracetate 21-acetate.

8. 9α - chloro - 1,4 - pregnadiene - 11β,17α,21 - triol-3,20-dione-11β-formate 21-acetate.

9. 9α - bromo - 4 - pregnene - 11β,17α,21 - triol - 3,20-dione-11β-formate 21-acetate.

10. 9α - bromo - 4 - pregnene - 11β,17α,21 - triol - 3,20-dione-11β-trifluoracetate 21-acetate.

11. 9α - bromo - 4 - pregnene - 11β - ol - 3,20 - dione-11β-trifluoracetate.

12. 9α - iodo - 1,4 - pregnadiene - 11β,17α,21 - triol-3,20-dione-11β,21-diacetate.

13. 9α - bromo - 1,4 - pregnadiene - 11β,17α,21 - triol-3,20-dione-11β,21-diacetate.

14. 9α - chloro - 1,4 - pregnadiene - 11β,17α,21 - triol-3,20-dione-11β,21-diacetate.

15. 9α - bromo - 16α - methyl - 1,4 - pregnadiene - 11β,17α,21-triol-3,20-dione-11β-trifluoracetate 21-acetate.

16. 9α - bromo - 16β - methyl - 1,4 - pregnadiene-11β,17α,21 - triol - 3,20 - dione - 11β - trifluoracetate 21-acetate.

17. 9α - bromo - 1,4 - pregnadiene - 11β,17α,21 - triol-3,20-dione-11β-acetate.

18. 9α - bromo - 1,4 - androstadiene - 11β - ol - 3,17-dione-11β-trifluoracetate.

19. 9α - bromo - 17α - methyl - 4 - androstene - 11β,17β-diol-3-one-11β-acetate.

20. The process of preparing a steroid of the pregnane and androstane series having a 9α-halogen substituent and an 11-substituent of the group consisting of lower alkanoyloxy, halogenated lower alkanoyloxy, mesyloxy, and tosyloxy which comprises reacting the corresponding $\Delta^{9,11}$-steroid of the series with an N-haloamide of a carboxylic acid, the halo substituent having an atomic weight greater than 19, in the presence of an acid selected from the group consisting of lower alkanoic acids, halogenated lower alkanoic acids, methanesulfonic acid, and p-toluenesulfonic acid.

21. In the process for preparing a 9α-halogeno-11β-ester of the pregnane series the step of converting a $\Delta^{9,11}$-steroid of the series into the corresponding 9α-bromo-11β-ester compound by reacting the former with an N-bromoamide of a carboxylic acid in the presence of a lower alkanoic acid.

22. The process of claim 21, wherein the reaction is carried out in the additional presence of a salt of the lower alkanoic acid.

23. The process of claim 21, wherein the alkanoic acid is formic.

24. The process of claim 21, wherein the alkanoic acid is trifluoracetic.

25. A member of the group consisting of 9α-halo-11β-R-17β-hydroxy-$\Delta^4$-androstenes and the $\Delta^1$-dehydro analogs thereof wherein R is a member of the group consisting of lower alkanoyloxy and halogenated lower alkanoyloxy and the 9α-halo substituent has an atomic weight greater than 19.

26. A compound of the group consisting of steroids of the 17-R-pregnane and 17β-hydroxyl androstane series having a 9α-halo substituent, said substituent having an atomic weight greater than 19, and a 11β-substituent selected from the group consisting of lower alkanoyloxy, halogenated lower alkanoyloxy, mesyloxy, and tosyloxy, wherein R is a member of the group consisting of hydrogen and α-hydroxyl.

References Cited in the file of this patent

UNITED STATES PATENTS

| | | |
|---|---|---|
| 2,800,489 | Reichstein | July 23, 1957 |
| 2,806,863 | Herr | Sept. 17, 1957 |
| 2,816,902 | Gould et al. | Dec. 17, 1957 |
| 2,837,464 | Nobile | June 3, 1958 |
| 2,852,511 | Fried | Sept. 16, 1958 |
| 2,852,538 | Scheri et al. | Sept. 16, 1958 |
| 2,864,835 | Gould et al. | Dec. 16, 1958 |
| 2,937,975 | Figdor et al. | May 24, 1960 |